(12) United States Patent
Gooden et al.

(10) Patent No.: US 7,650,214 B2
(45) Date of Patent: Jan. 19, 2010

(54) AVOIDING DRIFT ENGAGEMENT OF A HYDRAULIC CLUTCH

(75) Inventors: James T. Gooden, Canton, MI (US);
Bradley D. Riedle, Northville, MI (US);
Brian M. O'Neil, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 11/876,318

(22) Filed: Oct. 22, 2007

(65) Prior Publication Data

US 2009/0105916 A1 Apr. 23, 2009

(51) Int. Cl.
*G06F 17/00* (2006.01)

(52) U.S. Cl. ..................................... 701/67

(58) Field of Classification Search ............ 701/51, 701/67–69, 87, 95
See application file for complete search history.

(56) References Cited

U.S. PATENT DOCUMENTS

| | | | |
|---|---|---|---|
| 5,259,489 A | 11/1993 | Kimura et al. | |
| 6,478,713 B1 | 11/2002 | Runde et al. | |
| 6,672,990 B2 | 1/2004 | Netzer | |
| 6,773,368 B1 * | 8/2004 | Williames | 475/74 |

\* cited by examiner

*Primary Examiner*—Kim T Nguyen
(74) *Attorney, Agent, or Firm*—David B. Kelley; MacMillan, Sobanski & Todd, LLC

(57) ABSTRACT

A method for controlling speed of an input shaft to a hydraulically actuated clutch that includes a hydraulic balance dam volume includes determining a limit speed of the input shaft that varies as a function of time during a predetermined period after the clutch starts rotation and that causes a servo piston for actuating the clutch to move toward an engaged position, rotating the input shaft during the period, limiting a speed of the input shaft during said period to a determined limit speed corresponding to a current time after beginning the period, and allowing the speed of the input shaft to increase to a speed greater than the determined limit speed after expiration of the period.

10 Claims, 3 Drawing Sheets

AVOIDING DRIFT ENGAGEMENT OF A HYDRAULIC CLUTCH

BACKGROUND OF THE INVENTION

1. Field of the Invention

This invention relates generally to a hydraulically actuated control element of an automatic transmission, such as a clutch or brake, having a balance dam.

2. Description of the Prior Art

A balance dam is a device used in a hydraulically actuated clutch to reduce differential pressure across a piston of an actuating servo induced by centrifugal force.

Many balance dams include a vent near the inside diameter of the balance piston. This vent is intended to both allow oil to exit the balance dam when the clutch-apply piston strokes to engage a clutch and also to reduce the pressure in the balance dam cavity during normal operation. However, the balance cavity dam will at least partially empty through the vent when the clutch is stationary and when the engine is not running.

After the balance dam is partially drained and upon restarting the engine, the balance dam does not contain enough oil to function properly. If a vehicle operator immediately depresses the accelerator pedal and increases engine speed, this action may cause the clutch apply piston to inadvertently drift, thereby increasing torque capacity of the clutch.

In some transmissions while the engine rotates at idle speed, a clutch will rotate at a ratio of transmission input shaft speed, which will rotate at a ratio of engine speed.

This problem is further compounded by the frequent practice of applying other drive clutches when the transmission is in the neutral operating range. This allows the possibility of transferring torque to the output shaft, if engine speed is increased immediately after starting the engine and before the balance dam is refilled with fluid.

SUMMARY OF THE INVENTION

A method for controlling speed of an input shaft to a hydraulically actuated clutch that includes a hydraulic balance dam volume includes determining a limit speed of the input shaft that varies as a function of time during a predetermined period and while the input shaft rotates and that causes a servo piston for actuating the clutch to move toward an engaged position, rotating the input shaft during the period, limiting a speed of the input shaft during said period to a determined limit speed corresponding to a current time after beginning the period, and allowing the speed of the input shaft to increase to a speed greater than the determined limit speed after expiration of the period.

The control produces few design compromises and has virtually no sensible effect on vehicle operation or performance. Although the control briefly prevents immediate engine response in the event that a vehicle operator rapidly increases engine speed after starting the engine, the period of the delay is short and inadvertent movement of the vehicle is avoided.

The speed limiting control can be applied whenever a balance dam is not rotating and requires time to be refill with fluid when transitioning into an operating mode where it suddenly starts rotating during a change of operating gears of the transmission.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
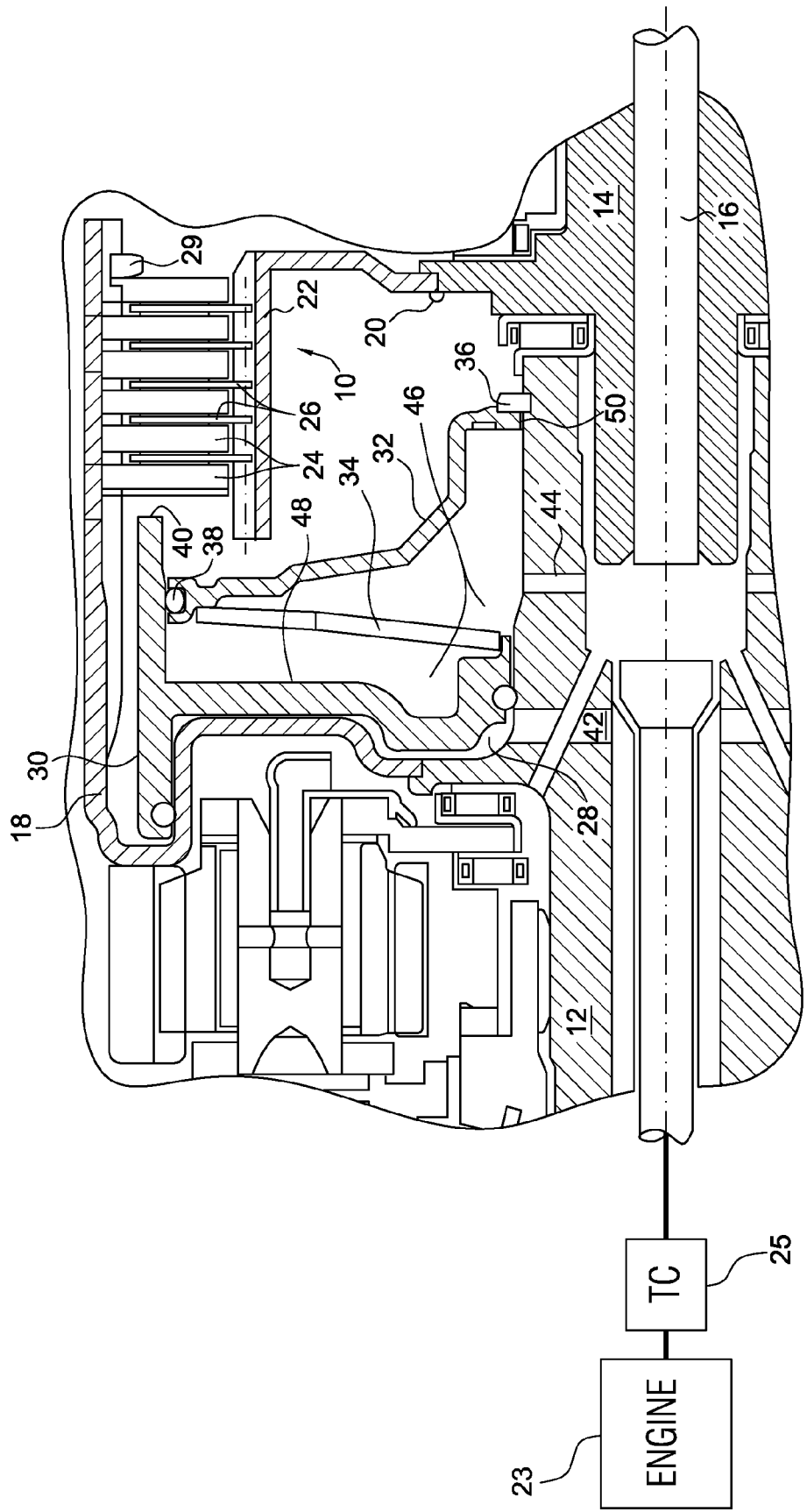
FIG. 1 is a cross section of a portion of an automatic transmission showing a clutch, its servo and a balance dam.

The clutch 10 shown in FIG. 1 alternately driveably connects and disconnects a clutch input shaft 12 and a shaft 14, which are supported for rotation about a central axis 16 within the casing of an automatic transmission. Shaft 12 is secured by a weld to a rotating drum 18, and shaft 14 is secured by a weld 20 to a rotating drum 22. Clutch input shaft 12 is driveably connected to an engine 23 through a torque converter 25. The inner surface of drum 18 is formed with a longitudinal spline, which is engaged by external splines formed on a series of spacer plates 24. Similarly, the external surface of drum 22 is formed with a longitudinal spline, which is engaged by internal splines formed on a series of friction discs 26, each disc being interleaved between two consecutive spacer plates 24.

Drum 18 defines the surface of a hydraulic cylinder 28, within which are located an axially displaceable piston 30, a balance dam 32, and return spring 34. Piston 30 carries a seal that contacts the outer surface of shaft 12 and a seal that contacts a surface of drum 18 against the passage of hydraulic fluid. Balance dam 32 is secured to shaft 12 by a snap ring 36 and carries a seal 38 at its radially outer surface that contacts an inner surface of piston 30. Return spring 34 is preferably a Belleville spring, which continually applies an axial force leftward in opposition to the movement of piston 30.

A snap ring 29, located at the end of the stack of spacer plates 24 and friction discs 26, provides a reaction to a force applied to the stack by the end 40 of piston 30 as it moves rightward in response to pressurizing the servo cylinder 28.

A hydraulic passage 42 supplies pressurized hydraulic fluid to cylinder 28, whereby a pressure force is produced on the end face of piston 30 that forces piston 30 rightward causing the spacer plates 24 and friction disks to engage frictionally and producing a drive connection between shaft 12 and shaft 14. When actuating hydraulic pressure in cylinder 28 is vented, spring 34 forces piston 30 to move leftward out of engagement with the pressure plates 24 and friction disks 26, thereby disengaging clutch 10 and releasing shaft 12 from shaft 14.

A similar hydraulic passage 44 carries hydraulic fluid to the volume 46 between balance dam 32 and the right hand face 48 of piston 30. Volume 46, piston 30 and cylinder 28 rotate about axis 16 as a unit with clutch input shaft 12. When clutch input shaft 12 rotates and no actuating pressure is applied to cylinder 28, piston 30 can move in response to differential pressure across the piston due to pressure induced by centrifugal force in cylinder 28 and balance dam volume 46.

Hydraulic fluid in the balance dam volume 46 tends to drain from that volume through a vent 50 at the inner radius of balance dam 32 and past snap ring 36 when input shaft 12 is not rotating.

Hydraulic fluid is added to the balance dam through hole 44, which communicates with the transmission's lube system.

The intended function of the balance dam vent 50 is to drain fluid from volume 46 so that the pressure in volume 46 acting against apply piston 30 is a function of rotational speed when the balance dam volume is filled with ATF, without any added pressure from the lube system. The vent 50 is sized so that ATF into the balance dam volume will exit through the vent without building up any backpressure. Vent 50 produces, however, the unintended function of allowing ATF in the balance dam volume 46 to drain out when piston 30 is not rotating, such as when the engine is off and the transmission pump is not operating.

Figure 2:
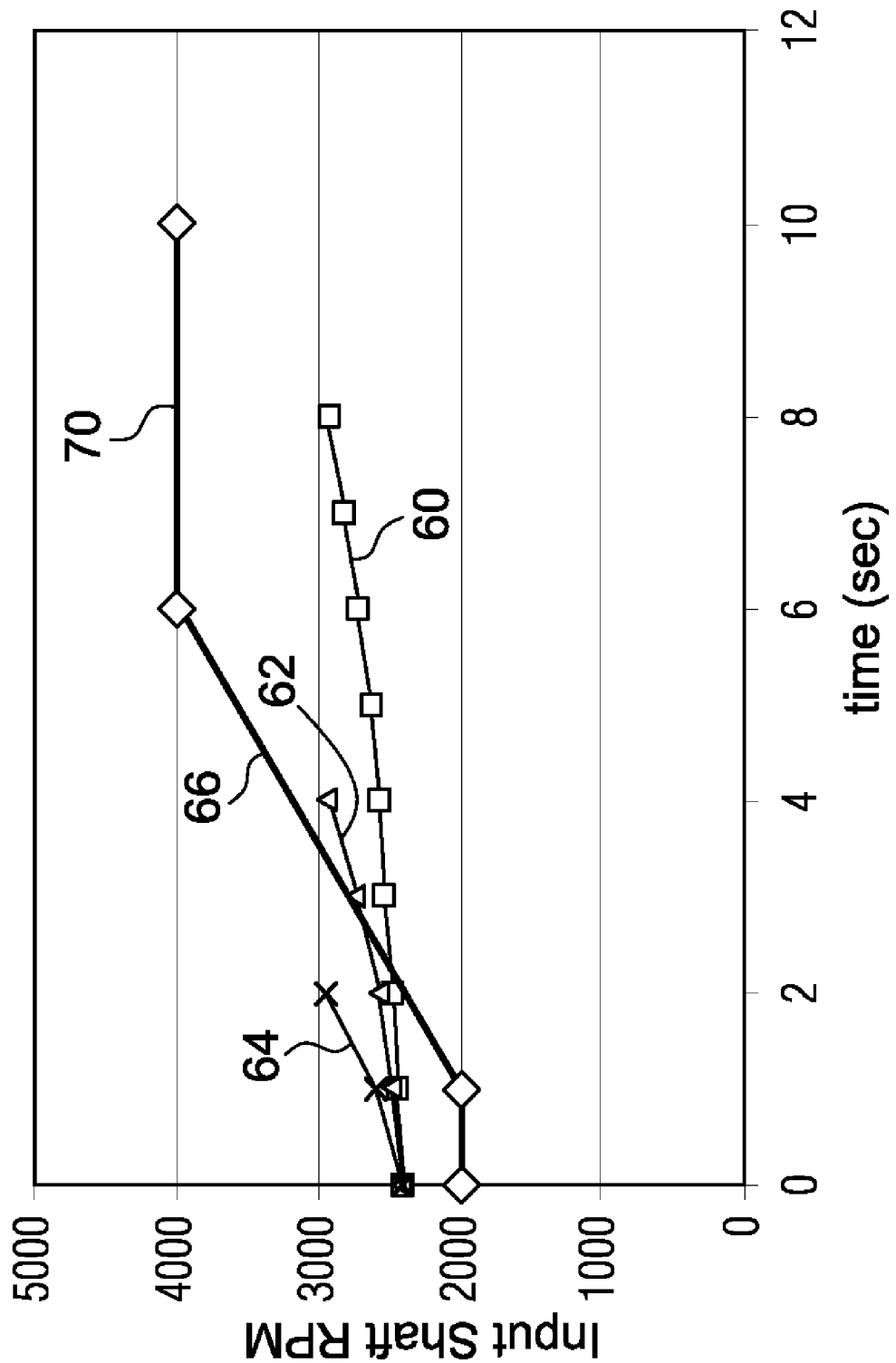
FIG. 2 is graph showing a speed limit during a control period and curves representing various flow rates into the balance dam volume.

The rate at which hydraulic fluid enters the balance dam volume 46 through passage 44 may vary. FIG. 2 is a graph relating speed of shaft 12 and time during a period in which volume 46 is being filled. Graph 60 represents the maximum speed that can be achieved without clutch drift on when using a flow rate of 1.0 liters per minute into the balance dam volume 46 and indicates that the volume is filled in eight seconds. Graph 62 represents the maximum speed that can be achieved without clutch drift on when using a flow rate of 2.0 liters per minute into the balance dam volume 46 and indicates that the volume is filled in four seconds. Graph 64 represents the maximum rotational speed that can be achieved without clutch drift on when using a flow rate of 4.0 liters per minute into the balance dam volume 46 and indicates that the volume is filled in two seconds. Graph 66 shows an example of a maximum rotational speed allowed of shaft 12 during a period whose length is ten seconds. The intended design will result in a lower rotational speed limit than the speed where clutch drift on can occur.

If graph 66 is selected as the limit speed of shaft 12, then the flow rate into volume 46 should be greater than 2 liters per minute. Otherwise, piston 12 begins to moves toward the clutch-engaged position due to an increase in pressure in sealed cylinder 28 caused by the effect of centrifugal force on the hydraulic fluid in cylinder 28 that is not sufficiently offset by the centrifugal pressure generated in the partially filled balance dam. If the flow rate into volume 46 is equal to or less than two liters per minute causing volume 46 to be only partially filled while shaft 12 is rotating, then the effect of centrifugal force on the hydraulic fluid in volume 46 will not be sufficient to cancel the effect of centrifugal force on the hydraulic fluid in cylinder 28. Consequently, piston 30 begins prematurely to move to engage clutch 10 before the magnitude of pressure applied to cylinder 28 through passage 42 reaches the pressure at which the clutch is to be engaged.

Figure 3:
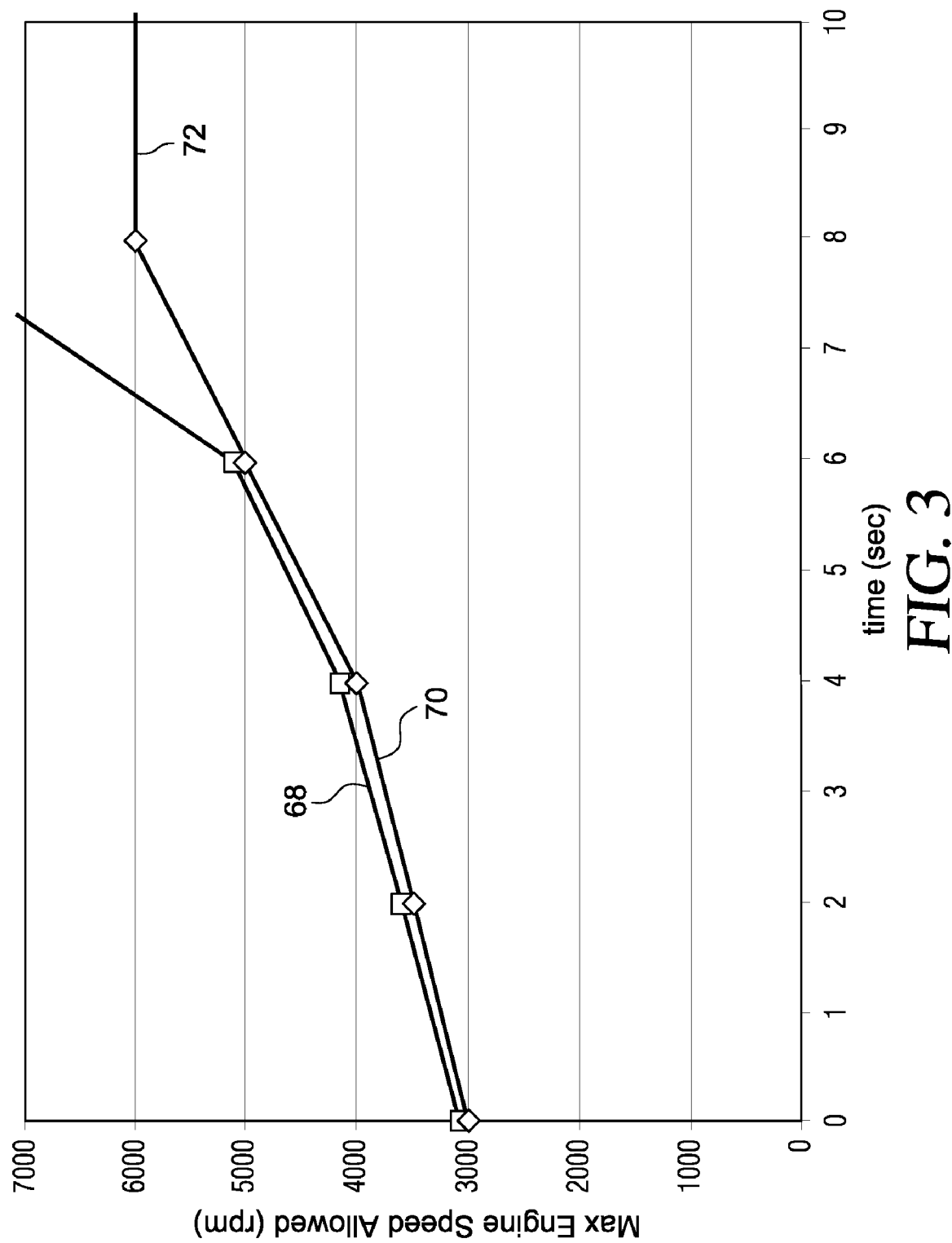
FIG. 3 is a graph showing the speed of a clutch shaft and the time following initial rotation of the shaft at which a clutch piston begins to move toward engagement.

FIG. 3 is a graph 68 showing the speed of clutch input shaft 12 and the time following initial rotation of shaft 12 at which piston 30 moves toward engagement of clutch 10 after the clutch has been stroked. Before this initiation of piston displacement, clutch 10 will have been stroked, i.e., cylinder 28 will have been filled with automatic transmission fluid (ATF) at relatively low stroking pressure, which pressure caused by centrifugal forces moves piston 30 rightward against the force of spring 34 from its position shown in FIG. 1, closing all the clearances among clutch plates 24 and discs 26, but without engaging clutch 10.

FIG. 3 also shows graph 70, which represents the variation of a limit speed of clutch input shaft 12, cylinder 28 and balance dam volume 46 during a predetermined period, whose length is ten seconds. At each point in time during the period, the limit speed 70 is lower than the reference speed at which piston 30 moves from its stroked position toward its engaged position. The maximum limit speed 72 is not exceeded during the period.

A control algorithm can be used to limit the speed of clutch input shaft 12 as a function of time which is related to the speed of shaft 12 by the speed ratio of the drive path that connects the engine crankshaft and shaft 12. For example, engine speed may be limited to 3500 rpm until two seconds of operation after engine startup, then to 4000 rpm until four seconds after engine startup, then to 5000 rpm until six seconds after startup, then to 6000 rpm until eight seconds after startup, and then held to 6000 rpm after 8 seconds.

The algorithm prevents cylinder 28 and balance dam volume 46 from rotating fast enough to cause piston 30 to drift inadvertently toward application or engagement of clutch 10. At some point in time, may be 5-10 seconds after rotation of cylinder 28 begins, the balance dam volume 46 will be full of ATF and will function as intended. After the period expires, ATF will have substantially filled the balance dam volume 46 such that a higher input shaft speed and cylinder speed do not move the piston without applying actuating pressure to cylinder 28 through passage 44.

Although the control is described with reference to a clutch 10 that driveably connects and disconnects two rotating components 12, 14, the control can be applied also to a brake that driveably connects and disconnects one rotating component and a non-rotating component, thereby braking or holding the rotating component against rotation. The terms "clutch" and "brake" are used interchangeably.

In accordance with the provisions of the patent statutes, the preferred embodiment has been described. However, it should be noted that the alternate embodiments can be practiced otherwise than as specifically illustrated and described.

What is claimed is:

1. In a motor vehicle powertrain having an automatic transmission, a clutch for controlling operation of the transmission, a cylinder for containing a first volume of hydraulic fluid, a balance dam for containing a second volume of hydraulic fluid, and a piston for actuating the clutch in response to differential pressure between the first and second volumes, a method for controlling engagement of the clutch, comprising the steps of:
   (a) determining a reference speed of rotation of the first and second volumes that varies as a function of time at which the piston begins to move to engage the clutch without applying actuating pressure to the first volume;
   (b) starting a period by rotating the first and second volumes; and
   (c) maintaining a speed of the first and second volumes during said period that is less than the reference speed that corresponds to the current length of the period.

2. The method of claim 1 further comprising the step of:
   after expiration of the period, allowing the speed of the first and second volumes to increase to a speed greater than the reference speed.

3. The method of claim 1 further comprising the steps of:
   determining a maximum limit speed of the first and second volumes; and
   limiting the speed of the first and second volumes during the period to the maximum limit speed.

4. The method of claim 1 wherein step (a) further comprises the steps of:
   stroking the clutch; and determining the reference speed of the first and second volumes that varies as a function of time after the clutch is stroked.

5. The method of claim 1 wherein step (a) further comprises the steps of:
filling the second volume with hydraulic fluid during a predetermined period before the reference speed reaches a predetermined reference speed corresponding to a length of the predetermined period.

6. In a motor vehicle powertrain having a clutch for controlling operation of a transmission, a piston, a first volume of hydraulic fluid, a chamber for containing a second volume of hydraulic fluid that may vary in magnitude, the piston actuating the clutch in response to differential pressure between the first and second volumes, a method for controlling engagement of the clutch, comprising the steps of:
(a) determining a reference speed of rotation of the first and second volumes that varies as a function of time at which the piston begins to move to engage the clutch without applying actuating pressure to the first volume;
(b) starting a period by rotating the first and second volumes; and
(c) maintaining a speed of the first and second volumes during said period that is less than the reference speed that corresponds to the current length of the period.

7. The method of claim 6 further comprising the step of:
after expiration of the period, allowing the speed of the first and second volumes to increase to a speed greater than the reference speed.

8. The method of claim 6 further comprising the steps of:
determining a maximum limit speed of the first and second volumes; and
limiting the speed of the first and second volumes during the period to the maximum limit speed.

9. The method of claim 6 wherein step (a) further comprises the steps of:
stroking the clutch; and
determining the reference speed of the first and second volumes that varies as a function of time after the clutch is stroked.

10. The method of claim 6 wherein step (a) further comprises the steps of:
filling the second volume with hydraulic fluid during a predetermined period before the reference speed reaches a predetermined reference speed corresponding to a length of the predetermined period.

* * * * *